United States Patent [19]

Yamazaki

[11] 4,119,368

[45] Oct. 10, 1978

[54] ELASTOMER DISPLAY DEVICE

[75] Inventor: Toru Yamazaki, Sayama, Japan

[73] Assignee: Citizen Watch Co. Ltd., Tokyo, Japan

[21] Appl. No.: 753,539

[22] Filed: Dec. 22, 1976

[30] Foreign Application Priority Data

Dec. 25, 1975 [JP] Japan .................... 50/159497

[51] Int. Cl.² .................................................. G02F 1/00
[52] U.S. Cl. .................................................. 350/360
[58] Field of Search .............. 350/161 S, 161 R, 355, 350/359, 360; 340/324 M

[56] References Cited

U.S. PATENT DOCUMENTS 3,907,407    9/1975    Vilkomerson et al. .......... 350/161 S Primary Examiner—Stanley D. Miller, Jr.
Assistant Examiner—James W. Davie
Attorney, Agent, or Firm—Sherman & Shalloway

[57] ABSTRACT

An elastomer display device which can discriminate by unaided visual observation a pattern to be displayed by utilizing elastic deformation of an elastomer produced upon application of an electric voltage thereto is disclosed. The device comprises a transparent substrate and four laminated coatings consisting of a transparent electric conductive membrane pattern to be displayed, a transparent elastomer coating, a metal reflecting coating and an electric conductive elastomer coating. Between the transparent electric conductive membrane pattern and the elastomer coating is interposed a transparent insulating coating which functions to decrease the voltage required for driving the elastomer display device. On the electric conductive elastomer coating is formed an opposed electrode formed of metal or electric conductive resin which functions to apply the voltage to overall surface of the display device. At least one of the electric conductive elastomer coating, transparent elastomer coating, metal reflecting coating and opposed electrode is formed into a pattern-shape which functions to prevent electric field from spreading out of the pattern and prevent frost-shaped surface deformation from being projected out of the pattern, thereby providing an elastomer display device having a high resolving power.

6 Claims, 9 Drawing Figures

ELASTOMER DISPLAY DEVICE

BACKGROUND OF THE INVENTION

1. Field of the Invention

This invention relates to an elastomer display device which can display a pattern which can be discriminated by the naked eye by utilizing elastic deformation of an elastomer produced upon application of an electric voltage thereto. Provision is made of four laminated coatings consisting of a transparent electric conductive membrane pattern to be displayed, an elastomer coating, a metal reflecting coating and an electric conductive elastomer coating superimposed one upon the other in the order if mentioned on a glass substrate and if an electric voltage is applied between the transparent electric conductive membrane pattern and the electric conductive elastomer coating. The surface portion of the elastomer coating which is opposed to the transparent electric conductive membrane pattern is deformed into frost-shaped indentations. Light incident through the glass substrate upon the frost-shaped indentations is irregularly reflected to produce light diffusion phenomenon which allows the pattern to be discriminated by visual observation with the naked eyes.

2. Description of the Prior Art

A conventional elastomer display device is composed of a glass substrate and four coatings consisting of a transparent electric conductive membrane pattern to be displayed, an elastomer coating having a volume resistivity of the order of $10^{15}$ $\Omega$cm, metal reflecting coating and an electric conductive elastomer coating superimposed one upon the other on the overall surface of the glass substrate so as to cover the overall surface of the pattern to be displayed. If an electric voltage is applied between the transparent electric conductive membrane pattern and the electric conductive elastomer coating, that surface portion of the elastomer coating which is opposed to the pattern to be displayed is deformed into frost-shaped indentations. A light incident through the glass substrate upon the elastomer coating is irregularly reflected by the surface deformed portion of the elastomer coating thus enabling the pattern to be displayed to be discriminated by naked eyes.

In such elastomer display device, in order to obtain contrast which is sufficient to clearly discriminate the pattern to be displayed by naked eyes, it is necessary to drive the device by applying a voltage of 80V to 100V. This driving voltage is dependent on the thickness of the elastomer coating and it is required to apply 5 KV to 10 KV per 1 mm of the thickness of the elastomer coating. As a result, in order to make the driving voltage small, the thickness of the elastomer coating must be made thin. As is well known, if the thickness of an elastomer coating formed of organic substance is made thin, pinholes exist in the thin elastomer coating which tend to induce insulation breakdown. Thus rendering the operation of the display device then becomes impossible. In addition, the wider the area to be displayed, the larger the probability of generating the pinholes. As a result, it is necessary to increase the lower limit of the thickness of the elastomer coating in dependence with the area to be displayed.

For the above described reasons, the conventional elastomer display device has the fatal disadvantages that high driving voltages are required, that the use of an elastomer coating of large thickness limits the construction of the circuit for operating the display device, and that the high driving voltage and the total volume of the elastomer coating render it impossible to widely use the display device.

In addition, for the purpose of making the driving voltage as small as possible provision has heretofore been made of a display device comprising an elastomer coating having such lower limit of thickness that its insulation breakdown does not occur. Such display device can prevent the insulation breakdown of the elastomer coating, but has the disadvantage that there is a risk of leakage current occurring and consuming a large amount of current.

In the conventional display device in which the elastomer coating, metal reflecting coating and electric conductive elastomer coating are superimposed one upon the other on the overall surface of the glass substrate, the electric field produced between the transparent electric conductive membrane pattern and the electric conductive elastomer coating becomes extended beyond the pattern to be displayed which blurs the outer peripheral portion of the pattern, thereby significantly deteriorating the resolving power of the display device.

In addition, in the conventional display device, an electric conductive elastomer coating having a high volume resistivity of the order of $10^3$ to $15^3$ $\Omega$cm is used as an opposed electrode, so that it is difficult to uniformly and effectively apply the voltage to the overall surface of the pattern to be displayed.

SUMMARY OF THE INVENTION

An object of the invention is to provide an elastomer display device of the kind described above which can obviate the above mentioned disadvantages encountered with the prior art devices.

Another object of the invention is to provide an elastomer display device which can decrease the driving voltage and hence significantly decrease the consumed current.

A further object of the invention is to provide an elastomer display device which can produce a good color image, and can eliminate blur that tends to be produced in the outer periphery of a pattern to be displayed thereby remarkably improving the resolving power.

DETAILED DESCRIPTION OF THE INVENTION

Figure 1A:
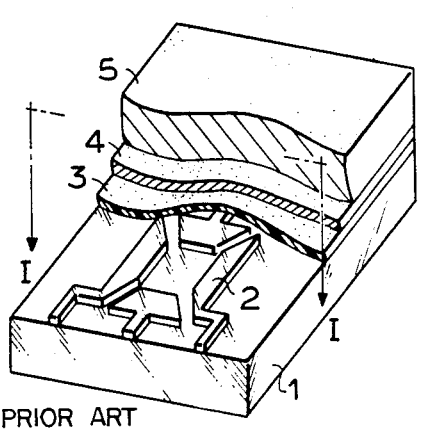
FIG. 1A is a perspective view of a conventional elastomer display device illustrating portions of the various coating thereof in cross section.
Figure 1B:
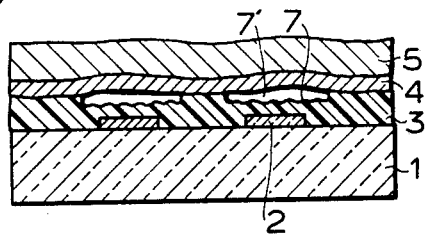
FIG. 1B is a cross-sectional view taken along line I—I of FIG. 1A showing deformed state of an elastomer coating.

FIGS. 1A and 1B show a conventional elastomer display device composed of a glass substrate 1 and four coatings consisting of a transparent electric conductive membrane pattern 2 to be displayed, an elastomer coating 3 having a volume resistivity of the order of $10^{15}$ Ωcm, a metal reflecting coating 4 each an electric conductive elastomer coating 5 and superimposed one upon the other on the overall surface of the glass substrate 1 so as to cover the overall surface of the pattern 2 to be displayed. If an electric voltage is applied between the transparent electric conductive membrane pattern 2 and the electric conductive elastomer coating 5, that surface portion 7 of the elastomer coating 3 which is opposed to the pattern 2 to be displayed is deformed into frost-shaped indentations. A light incident through the glass substrate 1 upon the frost-shaped indentation 7 is irregularly reflected by it, thus enabling the viewer to discriminate the pattern 2 to be displayed with the naked eyes.

Such conventional elastomer display device, however, has the disadvantages that it requires a high driving voltage thus consuming a large amount of current, and that there is a risk of the outer periphery of the pattern 2 to be displayed being blurred by the laminated coatings covering the overall surface of the glass substrate to deteriorate the resolving power.

In order to avoid such disadvantages, the invention provides an improved elastomer display device.

Figure 2:
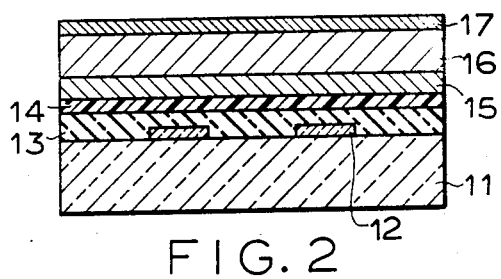
FIG. 2 is a cross-sectional view of one embodiment of the elastomer display device according to the invention.

FIG. 2 shows one embodiment of the elastomer display device according to the invention. In the present embodiment, on glass substrate 11 is formed transparent electric conductive membrane pattern 12 formed of an oxide mainly consisting of indium oxide or tin oxide. Then, the assembly is disposed in a vacuum vapor deposition device evacuated to a reduced pressure of $2 \times 10^{-5}$ Torr and on both the glass substrate 11 and the pattern 12 is vapor deposited transparent insulating coating 13 formed of silicon oxide and having a thickness of about 5000 Å to 10,000 Å. On the transparent insulating coating 13 is coated elastomer coating 14 by a spinner device. The elastomer coating 14 is formed of a transparent silicon resin having a volume resistivity of the order of $10^{15}$ Ωcm and a thickness of about 1μ to 3μ. Then, the elastomer coating 14 is subjected to a curing treatment at a temperature of 150° C. for 40 minutes. On elastomer coating 14 is formed metal reflecting coating 15 by a vacuum vapor deposition device. The metal reflecting coating 15 is formed of an indium membrane having a thickness of 300 Å to 1,000 Å. Then, electric conductive elastomer coating 16 formed of silicon resin mixed with carbon is printed on the metal reflecting coating 15 by a silk screen printing method. The electric conductive elastomer coating 16 is then dried and polymerized. On the electric conductive elastomer coating 16 is printed a silver paste which is then dried and cured to form an opposed electrode 17.

In the elastomer display device of FIG. 2, the transparent insulating coating, which in thin in thickness and has an excellent insulating property, is interposed between the transparent electric conductive membrane pattern 12 and the elastomer coating 14, so that it is possible to guarantee the insulating property of the elastomer coating 14 even if its thickness is sufficiently thin and an electric field efficiently applied to the elastomer coating 14, thereby decreasing the voltage required for driving the elastomer display device and hence significantly decreasing the current consumed by it.

Comparison tests of the conventional elastomer display device and the elastomer display device according to the invention have shown that the lowest driving voltage of the conventional elastomer display device is 70V and the consumed current thereof is 1,000 $\mu A/cm^2$ and that the lowest driving voltage of the elastomer display device according to the invention is 25V and the consumed current thereof is 5 $\mu A/cm^2$. As a result, the use of the transparent insulating coating 13 interposed between the transparent electric conductive membrane pattern 12 and the elastomer coating 14 provides the important advantage that the lowest voltage for driving the elastomer display device according to the invention can be made ½ times smaller than that for driving the conventional elastomer display device and that the current consumed by the former device can be made 1/200 times smaller than that consumed by the latter device.

In the present embodiment, the transparent insulating coating 13 was formed of silicon oxide for the purpose of obtaining the above described advantageous effect. The same effect may also be obtained by forming the transparent insulating coating 13 with the following inorganic substance or organic substance. The inorganic substance may include an oxide selected from the group consisting of silicon dioxide, aluminum oxide, yttrium oxide, barium titanate, hafnium oxide, tantalum oxide, zircanium oxide, magnesium oxide, cerium oxide and tin oxide or a fluoride selected from the group consisting of magnesium fluoride and calcium fluoride. The organic substance may be selected from the group consisting of polypropylene resin, acryl resin and polyimide resin.

Figure 3:
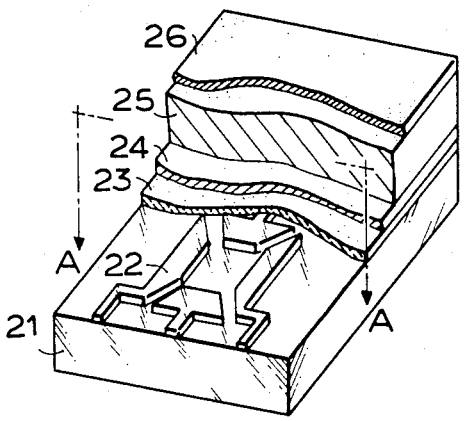
FIG. 3 is a perspective view of another embodiment of the elastomer display device according to the invention illustrating portions of the various coatings thereof in cross section.
Figure 4:
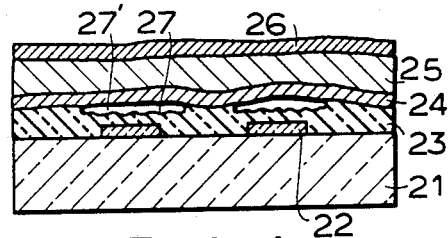
FIG. 4 is a cross-sectional view taken along line A—A of FIG. 3 showing deformed state of an elastomer coating.

FIGS. 3 and 4 show another embodiment of the elastomer display device according to the invention. In this embodiment, on glass substrate 21 is formed transparent electric conductive membrane pattern 22 mainly consisting of indium oxide or tin oxide. Elastomer coating 23 having a volume resistivity of the order of $10^{15}$ Ωcm, metal reflecting coating 24 and electric conductive elastomer coating 25 are superimposed one upon the other on both the glass substrate 21 and the transparent electric conductive membrane pattern 22.

In the present embodiment, in order to improve the display characteristic of the elastomer display device, on the electric conductive elastomer coating 25 is formed an opposed electrode 26 formed of metal or electric conductive resin.

If a voltage is applied between the transparent electric conductive membrane pattern 22 and the opposed electrode 26, that surface portion of the elastomer coating 23 which is opposed to the transparent electric conductive membrane 22 is deformed into frost-shaped indentations 27. Light incident through the glass substrate 21 upon the surface deformed portion 27 is irregularly reflected thereby enabling the viewer to discriminate the pattern 22. The use of the opposed electrode 26 ensures a uniform and effective application of the voltage to the overall surface of the display device and provides the important advantage that the display characteristic of the elastomer display device can be improved.

Figure 5:
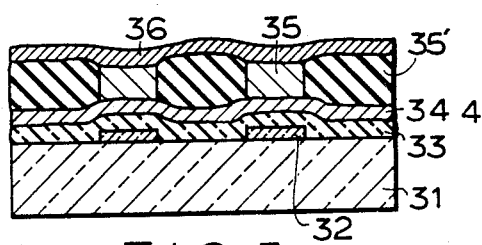
FIGS. 5 to 8 are cross-sectional views of other embodiments of the elastomer display device according to the invention, respectively.

FIG. 5 shows a further embodiment of the elastomer display device according to the invention. In the present embodiment, on glass substrate 31 is formed transparent electric conductive membrane pattern 32 on which is coated elastomer coating 33 by a spinner device. The elastomer coating 33 is formed of a transparent silicon resin having a volume resistivity of greater than $10^{15}$ Ωcm and a low viscosity, the elastomer coating 33 being coated with a thickness of about 5μ. Then, the elastomer coating 33 is subjected to a curing treatment at a temperature of 150° C. for about 40 minutes. On the elastomer coating 13 is formed and indium reflecting coating 34 having a thickness of 300 Å to 1,000 Å by a vacuum vapor deposition device evacuated to a reduced pressure of $2 \times 10^{-5}$ Torr. In the present embodiment, electric conductive elastomer coating 35 formed of silicon resin mixed with carbon is printed on that surface portion of the indium reflecting coating 34 which is opposed to the pattern 32 by a silk screen printing method. The electric conductive elastomer coating 35 is then polymerized. The surface portion of the indium reflecting coating 34 which is not coated with the electric conductive elastomer coating 35 is printed with a non-electric conductive silicon resin coating 35' which is then dried and subjected to a hardening treatment. Subsequently, on the overall surface of both the electric conductive elastomer coating 35 and the non-electric conductive silicon resin coating 35' is formed an opposed electrode 36 formed of metal, electric conductive resin, etc.

If a voltage of about 25V is applied between the transparent electric conductive membrane pattern 32 and the opposed electrode 36, frost-shaped indentations are produced along the patterns of both the transparent electric conductive membrane pattern 32 and the electric conductive elastomer coating 35. A light incident through the glass substrate 31 upon the surface deformed portion is irregularly reflected thereby enabling discrimination of the pattern 32. In the present embodiment, the electric conductive elastomer coating 35 which is pattern-shaped functions to limit the electric field within the pattern 32 so as to eliminate the blurred portion 27' of the frost-shaped indentations 27 shown in FIG. 4, and as a result, it is possible to significantly improve the resolving power of the pattern 32 to be displayed.

Figure 6:
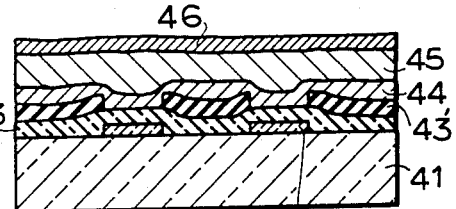

In FIG. 6 is shown a still further embodiment of the elastomer display device according to the invention. In the present embodiment, on glass substrate 41 is formed a transparent electric conductive membrane pattern 42 mainly consisting of indium oxide or tin oxide. Transparent elastomer coating 43 is formed on the overall surface to be displayed by a spinner device. The transparent elastomer coating 43 is formed of a transparent silicon resin having a volume resistivity of larger than $10^{15}$ Ωcm and a low viscosity, the elastomer coating 43 being coated with a thickness of about 5 μ. Then, the elastomer coating is subjected to a curing treatment at a temperature of 150° C. for about 40 minutes. In the present embodiment, a silicon resin coating 43' having a volume resistivity of $10^{15}$ Ωcm and a thickness of about 15μ is printed on that surface portion of the transparent elastomer coating 43 which is not opposed to the pattern 42 by a silk screen printing method. The silicon resin coating 43' is then dried and polymerized. On the silicon resin coating 43' and the remaining portion of the transparent elastomer coating 43 not covered with the silicon resin coating 43' are superimposed metal reflecting coating 44 consisting of indium, electric conductive elastomer coating 45 and opposed electrode 46 one upon the other in the order as mentioned. In the present embodiment, the thickness of that portion of the transparent elastomer coating 43 which is not opposed to the pattern 42 to be displayed is about three times thicker than that portion thereof which is opposed to the pattern 42, so that the extended portion 27' of the frost shaped deformation 27 (FIG. 4) is eliminated, thereby providing an elastomer display device having a high resolving power.

Figure 7:
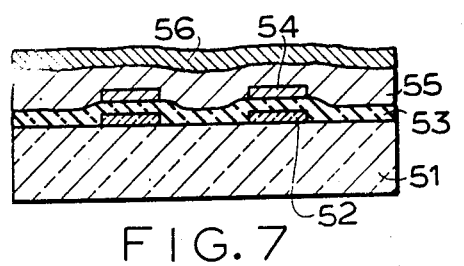

FIG. 7 shows another embodiment of the elastomer display device according to the invention. In the present embodiment, on a glass substrate 51 are superimposed transparent electric conductive membrane pattern 52 mainly consisting of indium oxide or tin oxide and transparent elastomer coating 53 one upon the other. In the present embodiment, on that surface portion of the transparent elastomer coating 53 which is opposed to the pattern 52 to be displayed is formed metal reflecting coating 54 consisting of indium through a mask by vacuum vapor deposition. On the metal reflecting coating 54 are superimposed electric conductive elastomer coating 55 and opposed electrode 56 one upon the other in the order as mentioned. In the present embodiment, if a voltage is applied between the pattern 52 and the opposed electrode 56, the frost-shaped surface deformation 27 becomes widened to reach to that surface portion 27' (FIG. 4) of the transparent elastomer coating 53 which is not opposed to the pattern 52 to be displayed. But, the portion 27' is not covered by the metal reflecting coating 54, so that a light incident through the glass plate 51 upon the elastomer coating 53 is not irregularly reflected. This makes it possible to discriminate the pattern 52 without blurring it and hence provide an elastomer display device having a high resolving power.

Alternatively, provision may be made of a transulucent insulating coating consisting of tellurium on that surface portion of the glass substrate 51 which is not coated with the pattern 52 before formation of the transparent elastomer coating 53 or after the transparent elastomer coating 53 has been formed, the translucent insulating coating may be coated on that surface portion of the elastomer coating 53 which is not opposed to the pattern 52 to be displayed through a mask by vacuum vapor deposition. As a result, it is possible to make the difference between the strength of reflected light from this translucent coating and the strength of reflected light from the pattern-shaped metal reflecting coating 54, thereby further improving the characteristic of the elastomer display device.

Figure 8:
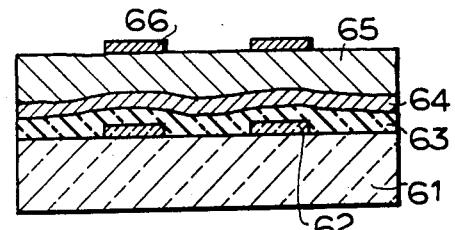

FIG. 8 shows another embodiment of the elastomer display device according to the invention. In the present embodiment, on glass substrate 61 are superimposed transparent electric conductive membrane pattern 62, transparent elastomer coating 63, metal reflecting coating 64 and electric conductive elastomer coating 65 one upon the other in the order as mentioned. In the present embodiment, opposed electrode 66 is shaped into a pattern corresponding to the pattern 62 and formed on the electric conductive elastomer coating 65. If a voltage is applied between the transparent electric conductive membrane pattern 62 and the pattern-shaped opposed electrode 66, the electric field produced therebetween is not extended over the pattern 62, so that there is no risk of the image of pattern 62 being blurred. Thus, it is possible to provide an elastomer display device having a high resolving power.

As explained hereinbefore, the elastomer display device according to the invention has the advantage that the use of the transparent insulating coating interposed between the transparent electric conductive membrane pattern and the elastomer coating ensures decrease of the voltage required for driving the elastomer display device, that the use of the opposed electrode ensures uniform and effective application of voltage to the overall surface of the pattern to be displayed, and that the use of pattern-shaped electric conductive elastomer coating, transparent elastomer coating, metal reflecting coating or opposed electrode renders it possible to prevent electric field from spreading out of the pattern and hence prevent the frost-shaped surface deformation from being projected out of the pattern, thereby providing an elastomer display device having a high resolving power.

In the above described embodiments, either one of the electric conductive elastomer coating, transparent elastomer coating, metal reflecting coating and opposed electrode was formed into a pattern-shape. It is a matter of course that at least two of these coatings may be formed into a pattern-shape for the purpose of attaining the above-described effect of the invention.

What is claimed is:

1. An elastomer display device comprising:
   (a) a transparent substrate;
   (b) a transparent electrically conductive membrane arranged on said transparent substrate according to a pattern to be displayed;
   (c) a transparent elastomer coating overlying and in contact with the transparent substrate and also overlying and in contact with the transparent conductive membrane pattern;
   (d) a metal reflecting coating overlying and contacting at least portions of the transparent elastomer coating;
   (e) a transparent insulating coating in contact with the metal reflecting coating and arranged according to a pattern which overlies the transparent substrate at those portions which are not covered by the transparent electrically conductive membrane pattern to be displayed;
   (f) a conductive elastomer coating in contact with the metal reflecting coating and overlying at least the transparent electrically conductive membrane pattern to be displayed;
   (g) an electrode layer overlying and in contact with the conductive elastomer coating.

2. An elastomer display device according to claim 1, wherein the conductive elastomer coating (f) is arranged in the same pattern as the pattern to be displayed.

3. The elastomer display device according to claim 2, wherein the transparent insulating coating (e) is arranged between the metal reflecting coating (d) and the electrode layer (g).

4. The elastomer display device according to claim 3, wherein the transparent elastomer coating (c) is formed from a transparent silicon resin having a volume resistivity of greater than $10^{15}$ $\Omega$cm and has a thickness of about 5 microns; the metal reflecting layer (d) has a thickness of 300 Å to 1,000 Å; and, the conductive elastomer coating (f) is formed of silicon resin mixed with carbon.

5. The elastomer display device according to claim 1, wherein the transparent insulating coating (e) is arranged between the metal reflecting coating (d) and the transparent elastomer coating (c).

6. The elastomer display device according to claim 5, whereing the transparent elastomer coating (c) is formed of a transparent silicon resin having a volume resistivity of greater than $10^{15}$ $\Omega$cm; the transparent insulating coating (e) is a silicon resin having a volume resistivity of about $10^{15}$ $\Omega$cm and a thickness of about 15$\mu$; and the thickness of the potion of the transparent elastomer coating (c) which is not opposed to the transparent electrically conductive membrane pattern (b) is about 3 times thicker than the portion of the transparent elastomer (c) which is opposed to the transparent electrically conductive membrane pattern (b).

* * * * *